United States Patent
Saxena et al.

(10) Patent No.: US 9,521,088 B2
(45) Date of Patent: Dec. 13, 2016

(54) DYNAMICALLY DETERMINING HOW MANY NETWORK PACKETS TO PROCESS

(71) Applicant: Citrix Systems, Inc., Bedford, MA (US)

(72) Inventors: Mohit Saxena, Bangalore (IN); Ramanjaneyulu Y Talla, Bangalore (IN); Saravana Annamalaisami, Chennai (IN)

(73) Assignee: Citrix Systems, Inc., Bedford, MA (US)

( * ) Notice: Subject to any disclaimer, the term of this patent is extended or adjusted under 35 U.S.C. 154(b) by 508 days.

(21) Appl. No.: 13/891,089

(22) Filed: May 9, 2013

(65) Prior Publication Data

US 2013/0304907 A1 Nov. 14, 2013

Related U.S. Application Data (60) Provisional application No. 61/644,877, filed on May 9, 2012.

(51) Int. Cl.
| | | |
|---|---|---|
| G06F 15/173 | (2006.01) | |
| H04L 12/923 | (2013.01) | |
| H04L 12/801 | (2013.01) | |

(52) U.S. Cl.
CPC ............. *H04L 47/762* (2013.01); *H04L 47/10* (2013.01)

(58) Field of Classification Search
USPC ................. 709/224, 202, 246, 244
See application file for complete search history.

(56) References Cited

U.S. PATENT DOCUMENTS

| | | | |
|---|---|---|---|
| 8,276,035 B1* | 9/2012 | Savarese | H04L 1/0007 714/749 |
| 2007/0064604 A1* | 3/2007 | Chen | H04L 1/0002 370/230 |
| 2008/0049630 A1* | 2/2008 | Kozisek | H04L 41/0823 370/250 |

* cited by examiner

*Primary Examiner* — Lan-Dai T Truong
(74) *Attorney, Agent, or Firm* — Fenwick & West LLP (57) ABSTRACT

A packet quota value, which indicates a maximum number of network packets that a network appliance processes before switching to a different task, is modified. Log data, which includes multiple log entries spanning a time interval, is accessed. Each log entry includes a processing time that indicates how much time the network appliance spent performing network traffic tasks before switching to the different task. The log data is analyzed. Responsive to the analysis indicating that a current state of network traffic is heavier than a maximum state of network traffic that was observed during the time interval, the packet quota value is increased. Responsive to the analysis indicating that the current state of network traffic is lighter than a minimum state of network traffic that was observed during the time interval, the packet quota value is decreased.

23 Claims, 4 Drawing Sheets

DYNAMICALLY DETERMINING HOW MANY NETWORK PACKETS TO PROCESS

RELATED APPLICATION

This application claims the benefit of U.S. Provisional Application No. 61/644,877, filed May 9, 2012, which is incorporated by reference herein in its entirety.

BACKGROUND

1. Field of Art

The invention generally relates to the field of data communication networks and in particular to dynamically determining how many network packets to process before switching to a different task.

2. Background Information

Network appliances that process and forward network traffic (e.g., packets) are often responsible for performing additional tasks. These tasks include, for example, tasks offloaded from other servers (e.g., compression, inter-process communication (IPC), remote procedure calls (RPC), and encryption such as secure sockets layer (SSL)) and housekeeping tasks (e.g., timer processing and statistics collection). Processing and forwarding network traffic is resource-intensive. If too many CPU cycles are allocated to network traffic tasks, then the offloaded tasks and housekeeping tasks will suffer, ultimately resulting in an overall decline in performance.

SUMMARY

The above and other issues are addressed by a method, non-transitory computer-readable storage medium, and system for modifying a packet quota value that indicates a maximum number of network packets that a network appliance processes before switching to a different task. An embodiment of the method comprises accessing log data that includes multiple log entries spanning a time interval. Each log entry includes a processing time that indicates how much time the network appliance spent performing network traffic tasks before switching to the different task. The method further comprises analyzing the log data. The method further comprises responsive to the analysis indicating that a current state of network traffic is heavier than a maximum state of network traffic that was observed during the time interval, increasing the packet quota value. The method further comprises responsive to the analysis indicating that the current state of network traffic is lighter than a minimum state of network traffic that was observed during the time interval, decreasing the packet quota value.

An embodiment of the medium stores executable computer program instructions for modifying a packet quota value that indicates a maximum number of network packets that a network appliance processes before switching to a different task. The instructions access log data that includes multiple log entries spanning a time interval. Each log entry includes a processing time that indicates how much time the network appliance spent performing network traffic tasks before switching to the different task. The instructions further analyze the log data. The instructions further increase the packet quota value, responsive to the analysis indicating that a current state of network traffic is heavier than a maximum state of network traffic that was observed during the time interval. The instructions further decrease the packet quota value, responsive to the analysis indicating that the current state of network traffic is lighter than a minimum state of network traffic that was observed during the time interval.

An embodiment of the system for modifying a packet quota value that indicates a maximum number of network packets that a network appliance processes before switching to a different task comprises at least one non-transitory computer-readable storage medium storing executable computer program instructions. The instructions comprise instructions for accessing log data that includes multiple log entries spanning a time interval. Each log entry includes a processing time that indicates how much time the network appliance spent performing network traffic tasks before switching to the different task. The instructions further analyze the log data. The instructions further increase the packet quota value, responsive to the analysis indicating that a current state of network traffic is heavier than a maximum state of network traffic that was observed during the time interval. The instructions further decrease the packet quota value, responsive to the analysis indicating that the current state of network traffic is lighter than a minimum state of network traffic that was observed during the time interval.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
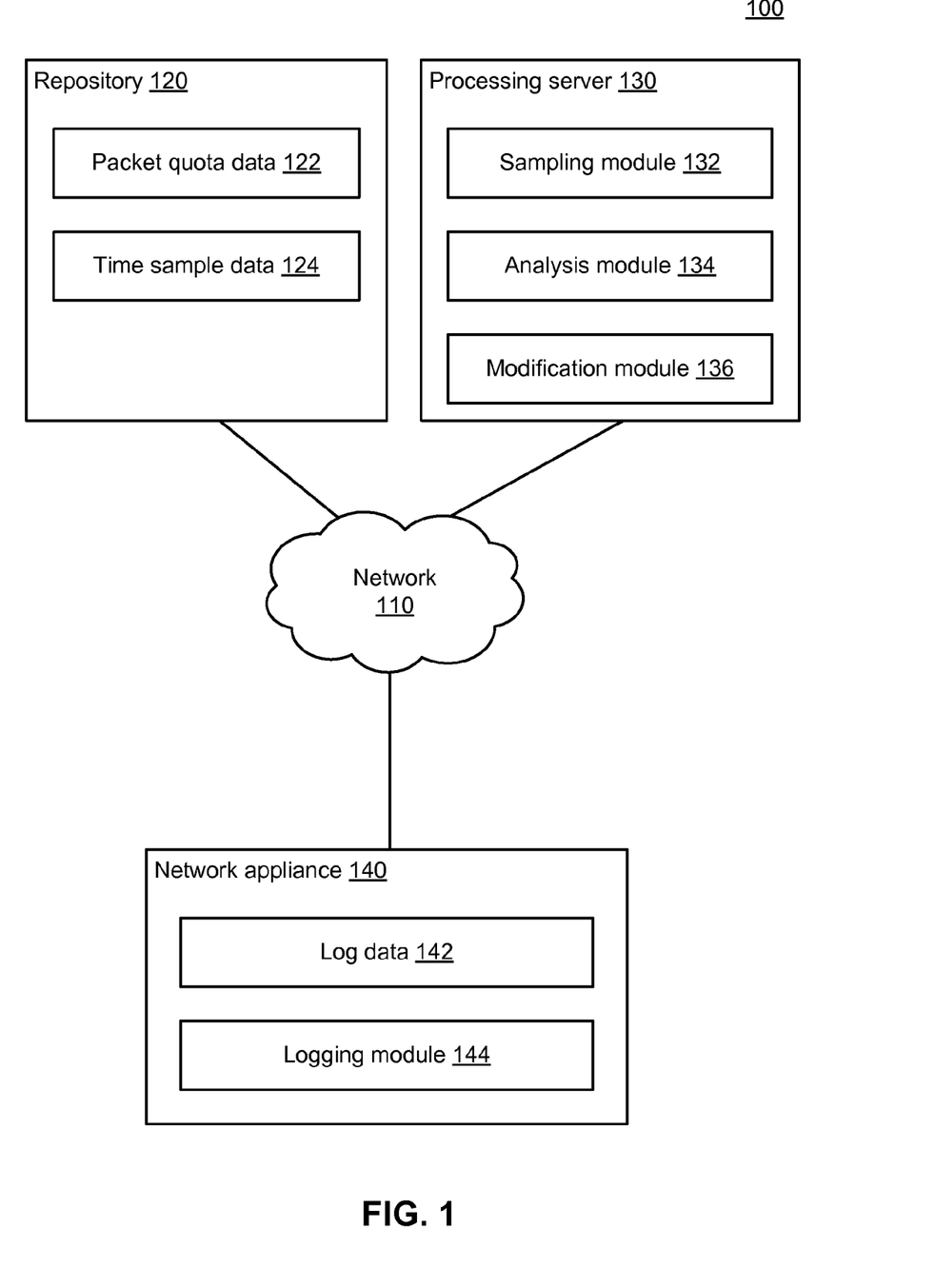
FIG. 1 is a high-level block diagram illustrating a system environment for dynamically determining how many network packets to process according to one embodiment.

FIG. 1 is a high-level block diagram illustrating a system environment 100 for dynamically determining how many network packets to process according to one embodiment. The environment 100 may be maintained by an enterprise that manages network appliances, such as a corporation, university, or government agency. As shown, the environment 100 includes a network 110, a repository 120, a processing server 130, and a network appliance 140. While only one of each entity is shown in the embodiment depicted in FIG. 1 for clarity, other embodiments can have multiple repositories 120, processing servers 130, and/or network appliances 140.

The network 110 represents the communication pathway between the repository 120, the processing server 130, and the network appliance 140. In one embodiment, the network 110 uses standard communications technologies and/or protocols and can include the Internet. Thus, the network 110 can include links using technologies such as Ethernet, 802.11, worldwide interoperability for microwave access (WiMAX), 2G/3G/4G mobile communications protocols, digital subscriber line (DSL), asynchronous transfer mode (ATM), and the like. Similarly, the networking protocols used on the network 110 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), etc. The data exchanged over the network 110 can be represented using technologies and/or formats including image data in binary form (e.g. Portable Network Graphics (PNG)), hypertext markup language (HTML), extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the entities on the network 110 can use custom and/or dedicated data communications technologies instead of, or in addition to, the ones described above.

The network appliance 140 is a computer (or set of computers) that processes and forwards network traffic (e.g., packets) and performs additional tasks. These tasks include, for example, tasks offloaded from other servers (e.g., compression, inter-process communication (IPC), remote procedure calls (RPC), and encryption such as secure sockets layer (SSL)) and housekeeping tasks (e.g., timer processing and statistics collection). The network appliance's processing resources, such as CPU, memory, system bus, etc., are divided between performing network traffic tasks (e.g., processing and forwarding network traffic), offloaded tasks, and housekeeping tasks. In particular, when the network appliance 140 is performing network traffic tasks, it processes up to a specified number of packets (referred to as a "packet quota") and then switches to performing offloaded tasks or housekeeping tasks. Generally, if the number of packets awaiting processing exceeds the packet quota, then only the packet quota number of packets will be processed, leaving some packets unprocessed. If the number of packets awaiting processing is equal to or less than the packet quota, then all of the packets will be processed. The network appliance 140 stores a default packet quota value that is used initially. In accordance with various embodiments, the packet quota is dynamically adjusted so that an appropriate amount of processing resources is spent on performing network traffic tasks.

The network appliance 140 stores log data 142 and a logging module 144. The logging module 144 monitors operation of the network appliance 140 when the network appliance is performing network traffic tasks. Specifically, the logging module 144 determines the amount of time the network appliance is spending performing network traffic tasks (i.e., processing up to the packet quota number of packets) before switching to offloaded tasks or housekeeping tasks. The logging module 144 stores these processing times as log data 142. In one embodiment, log data 142 includes entries in the form of <timestamp, processing time> tuples, where "timestamp" indicates a particular time interval during which the network appliance performed network traffic tasks (e.g., the start time or the end time of the interval) and "processing time" indicates the length of the interval (i.e., the amount of time that the network appliance spent performing network traffic tasks).

In one embodiment, the logging module 144 always monitors operation of the network appliance 140 (when the network appliance is performing network traffic tasks). In this embodiment, the logging module 144 stores processing times as log data 142 for all performances of network traffic tasks.

In another embodiment, the logging module 144 periodically monitors operation of the network appliance 140 (when the network appliance is performing network traffic tasks). In this embodiment, the logging module 144 stores processing times as log data 142 for some (but not all) performances of network traffic tasks. For example, the network appliance 140 maintains a logging timer (not shown) that is started during initialization of the network appliance 140. After performing network traffic tasks, the network appliance checks the status of the logging timer. If the logging timer has not expired, then the logging module 144 does nothing. If the logging timer has expired, then the logging module 144 starts to monitor operation of the network appliance 140 and store processing times as log data 142 for performances of network traffic tasks. After a particular period of time has passed or a particular amount of log data 142 has been stored, the logging timer is restarted, and the process repeats.

The repository 120 is a computer (or set of computers) that stores packet quota data 122 and time sample data 124. In one embodiment, the repository 120 includes a server that provides the processing server 130 access to packet quota data 122 and time sample data 124 in response to requests.

Packet quota data 122 includes a current value for the packet quota. As described above, the packet quota specifies a maximum number of packets for the network appliance 140 to process during one "network traffic task" time interval. Specifically, when the network appliance 140 is performing network traffic tasks, it processes up to the packet quota number of packets and then switches to performing offloaded tasks or housekeeping tasks. The current value for the packet quota is modified dynamically based on network traffic conditions (e.g., the amount and type of network traffic arriving at the network appliance 140 for processing) so that an appropriate amount of processing resources is spent on performing network traffic tasks. This dynamic modification is described below with reference to the processing server 130 and FIGS. 3 and 4.

In one embodiment, in addition to the current value, packet quota data 122 also includes a minimum value for the packet quota and/or a maximum value for the packet quota. In this embodiment, the current value of the packet quota cannot be set below the minimum value and/or above the maximum value.

Time sample data 124 includes a portion of log data 142 (obtained from the network appliance 140). Recall that log data 142 stores entries in the form of <timestamp, processing time> tuples, where "timestamp" indicates a particular time interval during which the network appliance performed network traffic tasks and "processing time" indicates the length of the interval. Specifically, time sample data 124 includes N entries of log data (e.g., N <timestamp, processing time> tuples).

In one embodiment, in addition to the N<timestamp, processing time> tuples, time sample data 124 also includes a sampling time interval. The sampling time interval specifies how frequently log data 142 should be obtained from the network appliance 140 (and then stored as <timestamp, processing time> tuples within the time sample data 124 and analyzed). The sampling time interval can be, for example, a default value or a value input by a user.

Note that the packet quota data 122 and the time sample data 124 are associated with the same network appliance (namely, network appliance 140). If the system environment 100 includes multiple network appliances (140A, 140B, etc.), then there will be additional packet quota data (122A, 122B, etc.) and additional time sample data (124A, 124B, etc.). This additional packet quota data and time sample data can be differentiated by, for example, associating it with an indication of the relevant network appliance (e.g., the network appliance's network device identifier or IP address).

The processing server 130 includes various modules such as a sampling module 132 for obtaining processing time data, an analysis module 134 for analyzing processing time data, and a modification module 136 for modifying the current value of the packet quota (if appropriate). In one embodiment, the processing server 130 includes a computer (or set of computers) that communicates with repository 120 and network appliance 140 and processes data (e.g., by executing the sampling module 132, the analysis module 134, and the modification module 136).

The sampling module 132 obtains processing time data. In one embodiment, the sampling module 132 obtains N entries of log data 142 (e.g., N<timestamp, processing time> tuples) from the network appliance 140 and stores the N entries of log data within time sample data 124. The N entries of log data obtained are, for example, the N most-recent <timestamp, processing time> tuples logged by the logging module 144. The sampling module 132 obtains the N entries of log data periodically, such as once per sampling time interval (specified in time sample data 124).

The analysis module 134 analyzes processing time data. In one embodiment, the analysis module 134 analyzes the N entries of log data (e.g., N<timestamp, processing time> tuples) stored within time sample data 124 and, based on that analysis, determines whether to modify a current packet quota value. The analysis module 134 can perform the analysis and determination in various ways. In one embodiment, the analysis module 134 performs the analysis and determination as follows:

From among the N<timestamp, processing time> tuples stored within time sample data 124, the analysis module 134 determines the <timestamp, processing time> tuple that was most-recently logged. The processing time of this tuple (referred to as "S") indicates the current state of network traffic (e.g., the amount and type of network traffic arriving at the network appliance 140 for processing). From among the N−1 remaining <timestamp, processing time> tuples stored within time sample data 124 (i.e., not including the most-recently-logged <timestamp, processing time> tuple), the analysis module 134 determines the largest processing time (referred to as "t1") and the smallest processing time (referred to as "t2"). Processing times t1 and t2 indicate the range of network traffic states that have been observed within the most recent time interval.

The analysis module 134 determines whether S exceeds t1. If S exceeds t1 (i.e., S>t1), then the current state of network traffic is heavier than the maximum state of network traffic that was observed during the most recent sampling time interval. To accommodate the heavy network traffic, a determination is made to increase the current packet quota value. Increasing the current packet quota value allows more packets to be processed during a single "network traffic task" time interval, effectively removing resources from performing offloaded tasks or housekeeping tasks.

The analysis module 134 determines whether S is smaller than t2. If S is smaller than t2 (i.e., S<t2), then the current state of network traffic is lighter than the minimum state of network traffic that was observed during the most recent sampling time interval. To accommodate the light network traffic, a determination is made to decrease the current packet quota value. Decreasing the current packet quota value allows fewer packets to be processed during a single "network traffic task" time interval, effectively adding resources to performing offloaded tasks or housekeeping tasks.

The modification module 136 modifies the current value of the packet quota (if appropriate). For example, the modification module 136 modifies the current value of the packet quota stored in packet quota data 122. In one embodiment, if the modification module 136 increases the current value of the packet quota, it does so by doubling the current packet quota value (limited by a maximum value for the packet quota, if any). The maximum value acts as a ceiling when modifying the current value for the packet quota. In other words, if doubling the current value for the packet quota results in a value larger than the maximum value, then the current value is set to the maximum value. In another embodiment, if the modification module 136 decreases the current value of the packet quota, it does so by halving the current packet quota value (limited by a minimum value for the packet quota, if any). The minimum value acts as a floor when modifying the current value for the packet quota. In other words, if halving the current value for the packet quota results in a value smaller than the minimum value, then the current value is set to the minimum value.

The modification module 136 can also send the current (possibly modified) packet quota value to the network appliance 140. The network appliance 140 can then use the received packet quota value to determine how many packets to process before switching to offloaded tasks or housekeeping tasks. In one embodiment, the modification module 136 always sends the current (possibly modified) packet quota value to the network appliance 140. In another embodiment, the modification module 136 sends the current packet quota value to the network appliance 140 only if the current packet quota value differs from the previous packet quota value (i.e., only if the modification module 136 modified the value of the packet quota).

Figure 2:
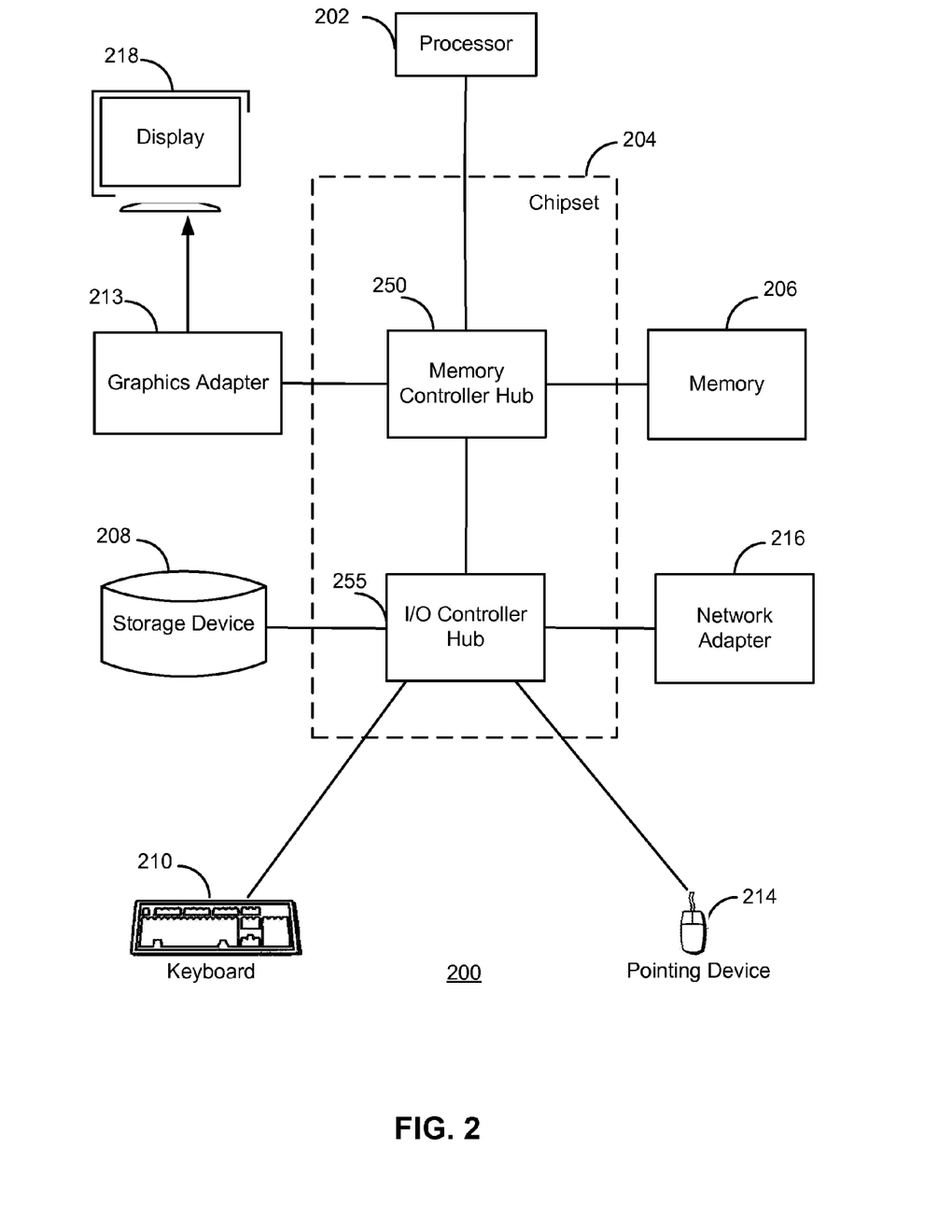
FIG. 2 is a high-level block diagram illustrating an example of a computer for use as a repository, a processing server, and/or a network appliance, in accordance with one embodiment.

FIG. 2 is a high-level block diagram illustrating an example of a computer 200 for use as a repository 120, a processing server 130, and/or a network appliance 140 in accordance with one embodiment. Illustrated are at least one processor 202 coupled to a chipset 204. The chipset 204 includes a memory controller hub 250 and an input/output (I/O) controller hub 255. A memory 206 and a graphics adapter 213 are coupled to the memory controller hub 250, and a display device 218 is coupled to the graphics adapter 213. A storage device 208, keyboard 210, pointing device 214, and network adapter 216 are coupled to the I/O controller hub 255. Other embodiments of the computer 200 have different architectures. For example, the memory 206 is directly coupled to the processor 202 in some embodiments.

The storage device 208 includes one or more non-transitory computer-readable storage media such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 213 displays images and other information on the display device 218. In some embodiments, the display device 218 includes a touch screen capability for receiving user input and selections. The network adapter 216 couples the computer system 200 to the network 110. Some embodiments of the computer 200 have different and/or other components than those shown in FIG. 2. For example, the repository 120, the processing server 130, and/or the network appliance 140 can be formed of multiple blade servers and lack a display device, keyboard, and other components.

The computer 200 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

Figure 3:
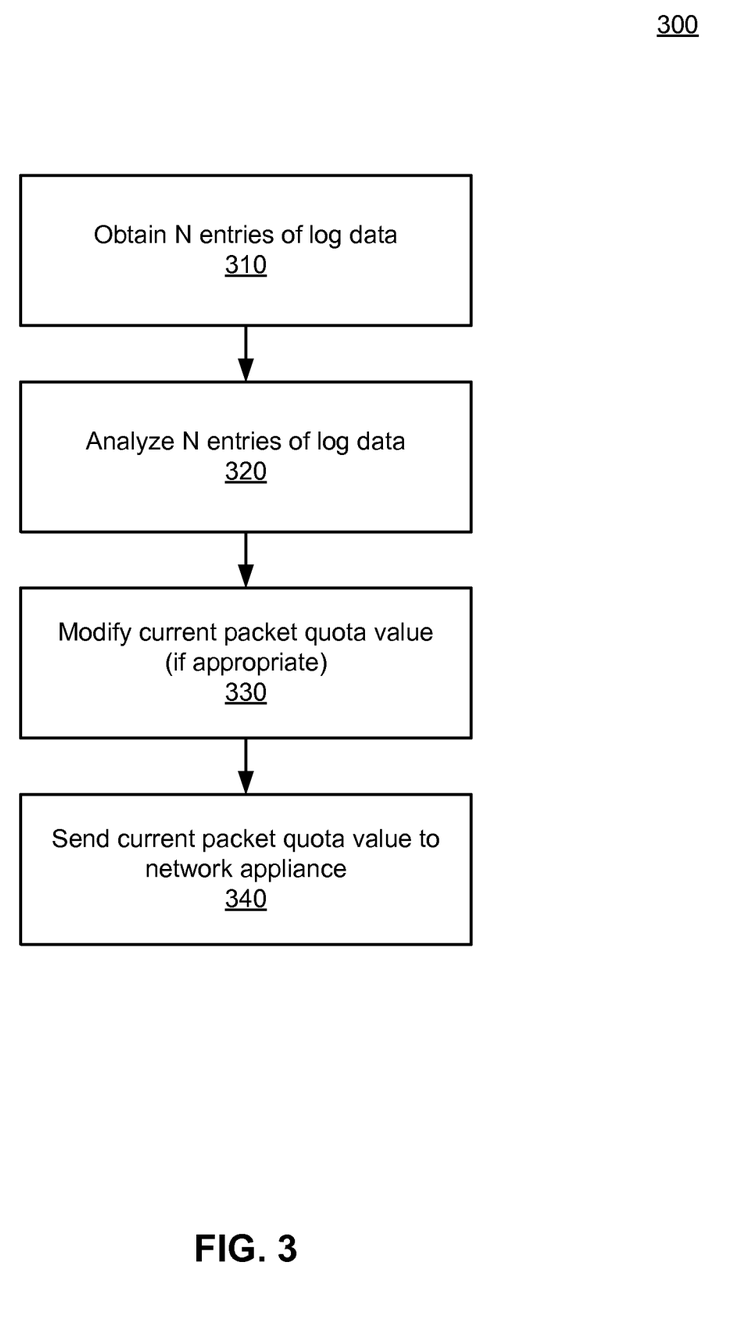
FIG. 3 is a flowchart illustrating a method performed by the processing server for dynamically determining how many network packets to process according to one embodiment.

FIG. 3 is a flowchart illustrating a method 300 performed by the processing server 130 for dynamically determining how many network packets to process according to one embodiment. Other embodiments can perform the steps in different orders and can include different and/or additional steps. In addition, some or all of the steps can be performed by entities other than those shown in FIG. 1. In one embodiment, the method 300 is performed periodically, such as once per sampling time interval (specified in time sample data 124).

When the method 300 starts, an initial value for the current packet quota has already been specified and stored within the packet quota data 122. At this point, the method 300 begins.

In step 310, N entries of log data are obtained. For example, the sampling module 132 obtains N<timestamp, processing time> tuples from the network appliance 140 and stores them within time sample data 124.

In step 320, the N entries of log data are analyzed. For example, the analysis module 134 analyzes the N<timestamp, processing time> tuples stored within time sample data 124 and, based on that analysis, determines whether to modify the current packet quota value stored in packet quota data 122. Step 320 is further described in FIG. 4.

In step 330, the current packet quota value is modified (if appropriate). For example, the modification module 136 modifies the current value of the packet quota stored in packet quota data 122 (if, in step 320, the analysis module 134 determined that the current packet quota value should be modified).

In step 340, the current packet quota value is sent to the network appliance 140. For example, the modification module 136 obtains the current packet quota value from the packet quota data 122 and sends this value to the network appliance 140.

Figure 4:
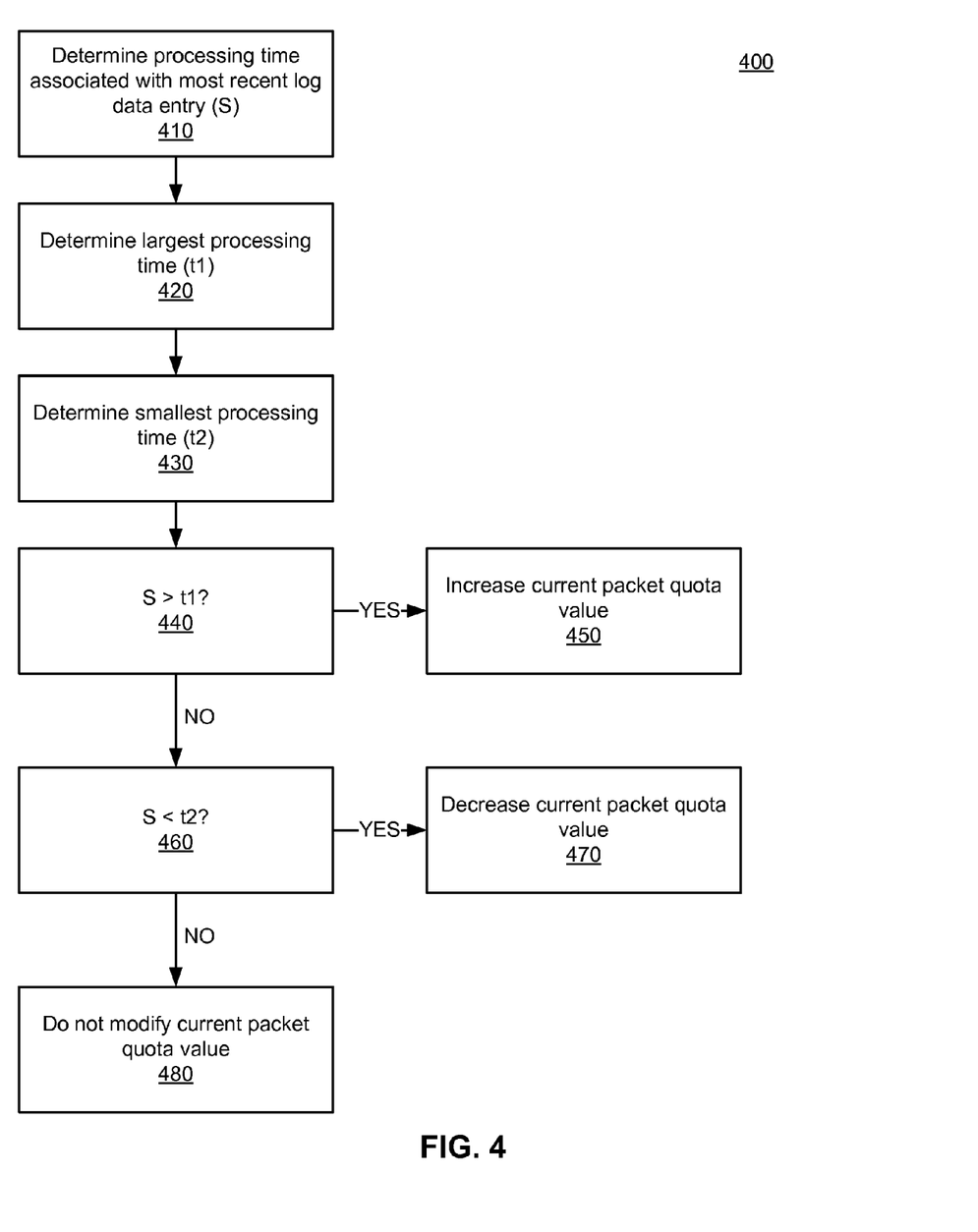
FIG. 4 is a flowchart illustrating a method performed by an analysis module for analyzing log data entries to determine whether to modify a current packet quota value according to one embodiment.

FIG. 4 is a flowchart illustrating a method 400 performed by the analysis module 134 for analyzing log data entries to determine whether to modify a current packet quota value according to one embodiment. Other embodiments can perform the steps in different orders and can include different and/or additional steps. In addition, some or all of the steps can be performed by entities other than those shown in FIG. 1. The method 400 corresponds to step 320 in FIG. 3.

When the method 400 starts, N entries of log data (e.g., N<timestamp, processing time> tuples) have been obtained from the network appliance 140 and stored within time sample data 124. At this point, the method 400 begins.

In step 410, the processing time associated with the most recent log data entry (referred to as "S") is determined. For example, the analysis module 134 determines, from among the N<timestamp, processing time> tuples stored within time sample data 124, the <timestamp, processing time> tuple that was most-recently logged.

In step 420, the largest processing time (referred to as "t1") is determined. For example, the analysis module 134 determines, from among the N−1 remaining <timestamp, processing time> tuples stored within time sample data 124 (i.e., not including the most-recently-logged <timestamp, processing time> tuple), the largest processing time.

In step 430, the smallest processing time (referred to as "t2") is determined. For example, the analysis module 134 determines, from among the N−1 remaining <timestamp, processing time> tuples stored within time sample data 124 (i.e., not including the most-recently-logged <timestamp, processing time> tuple), the smallest processing time.

In step 440, a determination is made regarding whether S exceeds t1. For example, this determination is made by the analysis module 134. If S exceeds t1, then the method 400 proceeds to step 450, and a determination is made to increase the current packet quota value.

If S does not exceed t1, then the method 400 proceeds to step 460, and a determination is made regarding whether S is smaller than t2. For example, this determination is made by the analysis module 134. If S is smaller than t2, then the method 400 proceeds to step 470, and a determination is made to decrease the current packet quota value.

If S is not smaller than t2, then the method 400 proceeds to step 480, and a determination is made not to modify the current packet quota value.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method for modifying a packet quota value that indicates a maximum number of network packets that a network appliance performs network traffic tasks on to process and forward the network packets before switching to a different task, comprising:
   accessing log data that includes multiple log entries spanning a time interval, each log entry including a processing time that indicates how much time the network appliance spent performing the network traffic tasks before switching to the different task, where the different task is a housekeeping task or an offloaded task;
   analyzing the log data;
   responsive to the analysis indicating that a current state of network traffic is heavier than a maximum state of network traffic that was observed during the time interval, increasing the packet quota value to increase the maximum number of network packets on which the network appliance performs the network traffic tasks before switching to the different task; and
   responsive to the analysis indicating that the current state of network traffic is lighter than a minimum state of network traffic that was observed during the time interval, decreasing the packet quota value to decrease the maximum number of network packets on which the network appliance performs the network traffic tasks before switching to the different task.

2. The method of claim 1, wherein analyzing the log data comprises determining the current state of network traffic.

3. The method of claim 2, wherein determining the current state of network traffic comprises:
identifying a most-recent log entry; and
determining that the processing time of the identified log entry represents the current state of network traffic.

4. The method of claim 2, wherein analyzing the log data further comprises determining the maximum state of network traffic that was observed during the time interval.

5. The method of claim 4, wherein determining the maximum state of network traffic that was observed during the time interval comprises:
identifying a log entry, other than a most-recent log entry, with a largest processing time; and
determining that the processing time of the identified log entry represents the maximum state of network traffic that was observed during the time interval.

6. The method of claim 4, wherein analyzing the log data further comprises comparing the current state of network traffic to the maximum state of network traffic that was observed during the time interval.

7. The method of claim 2, wherein analyzing the log data further comprises determining the minimum state of network traffic that was observed during the time interval.

8. The method of claim 7, wherein determining the minimum state of network traffic that was observed during the time interval comprises:
identifying a log entry, other than a most-recent log entry, with a smallest processing time; and
determining that the processing time of the identified log entry represents the minimum state of network traffic that was observed during the time interval.

9. The method of claim 7, wherein analyzing the log data further comprises comparing the current state of network traffic to the minimum state of network traffic that was observed during the time interval.

10. The method of claim 1, wherein increasing the packet quota value comprises doubling the packet quota value.

11. The method of claim 1, wherein decreasing the packet quota value comprises halving the packet quota value.

12. The method of claim 1, wherein the packet quota value cannot be increased above a maximum value.

13. The method of claim 1, wherein the packet quota value cannot be decreased below a minimum value.

14. The method of claim 1, wherein each log entry further includes a timestamp that indicates a particular time interval during which the network appliance performed network traffic tasks before switching to the different task.

15. The method of claim 14, wherein the timestamp indicates a start of the particular time interval or an end of the particular time interval.

16. The method of claim 1, wherein an offloaded task is a task offloaded from another server to the network appliance and selected from one of a compression task, inter-process communication task, remote procedure call task, and encryption task.

17. The method of claim 1, wherein a housekeeping task is selected from one of a timer processing task and statistics collection task performed by the network appliance.

18. A non-transitory computer-readable storage medium storing executable computer program instructions for modifying a packet quota value that indicates a maximum number of network packets that a network appliance performs network traffic tasks on to process and forward the network packets before switching to a different task, the instructions performing steps comprising:
accessing log data that includes multiple log entries spanning a time interval, each log entry including a processing time that indicates how much time the network appliance spent performing the network traffic tasks before switching to the different task, where the different task is a housekeeping task or an offloaded task;
analyzing the log data;
responsive to the analysis indicating that a current state of network traffic is heavier than a maximum state of network traffic that was observed during the time interval, increasing the packet quota value to increase the maximum number of network packets on which the network appliance performs the network traffic tasks before switching to the different task; and
responsive to the analysis indicating that the current state of network traffic is lighter than a minimum state of network traffic that was observed during the time interval, decreasing the packet quota value to decrease the maximum number of network packets on which the network appliance performs the network traffic tasks before switching to the different task.

19. The computer-readable storage medium of claim 18, wherein analyzing the log data comprises determining the current state of network traffic.

20. The computer-readable storage medium of claim 19, wherein determining the current state of network traffic comprises:
identifying a most-recent log entry; and
determining that the processing time of the identified log entry represents the current state of network traffic.

21. The non-transitory computer-readable storage medium of claim 18, wherein an offloaded task is a task offloaded from another server to the network appliance and selected from one of a compression task, inter-process communication task, remote procedure call task, and encryption task, and wherein a housekeeping task is selected from one of a timer processing task and statistics collection task performed by the network appliance.

22. A system for modifying a packet quota value that indicates a maximum number of network packets that a network appliance performs network traffic tasks on to process and forward the network packets before switching to a different task, the system comprising:
at least one non-transitory computer-readable storage medium storing executable computer program instructions comprising instructions for:
accessing log data that includes multiple log entries spanning a time interval, each log entry including a processing time that indicates how much time the network appliance spent performing the network traffic tasks before switching to the different task, where the different task is a housekeeping task or an offloaded task;
analyzing the log data;
responsive to the analysis indicating that a current state of network traffic is heavier than a maximum state of network traffic that was observed during the time interval, increasing the packet quota value to increase the maximum number of network packets on which the network appliance performs the network traffic tasks before switching to the different task; and
responsive to the analysis indicating that the current state of network traffic is lighter than a minimum state of network traffic that was observed during the time interval, decreasing the packet quota value to decrease the maximum number of network packets on which the network appliance performs the network traffic tasks before switching to the different task;

and a processor for executing the computer program instructions.

23. The system of claim 22, wherein an offload task is a task offloaded from another communication task, remote procedure call task, and encryption task, and wherein a housekeeping task is selected from one of a timer processing task and statistics collection task performed by the network appliance.

* * * * *

UNITED STATES PATENT AND TRADEMARK OFFICE
CERTIFICATE OF CORRECTION

PATENT NO. : 9,521,088 B2  
APPLICATION NO. : 13/891089  
DATED : December 13, 2016  
INVENTOR(S) : Saxenia et al.

Page 1 of 1

It is certified that error appears in the above-identified patent and that said Letters Patent is hereby corrected as shown below:

In the Claims

Column 11 Claim 23, Line 5, replace "offload" with --offloaded--.

Signed and Sealed this  
Ninth Day of May, 2017

Michelle K. Lee  
*Director of the United States Patent and Trademark Office*